(12) United States Patent
Nagarajan et al.

(10) Patent No.: US 9,608,866 B2
(45) Date of Patent: Mar. 28, 2017

(54) DIGITAL LINK VIEWER WITH PAGING FOR SUPER-CHANNELS

(71) Applicant: Infinera Corporation, Sunnyvale, CA (US)

(72) Inventors: Karthikeyan Mathruboodham Nagarajan, Bangalore (IN); Naveen Narasimha Hegde, Bangalore (IN); Vinesh Raghavan, Bangalore (IN); Purushotham Pururava Pushpavanth, Chikkaballapur District (IN); Musab Qamri, Karwar (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/879,987

(22) Filed: Oct. 9, 2015

(65) Prior Publication Data

US 2017/0033999 A1   Feb. 2, 2017

(51) Int. Cl.
*H04Q 11/00* (2006.01)
*H04L 12/24* (2006.01)
*H04B 10/079* (2013.01)

(52) U.S. Cl.
CPC ... *H04L 41/0896* (2013.01); *H04B 10/07955* (2013.01); *H04L 41/0686* (2013.01); *H04L 41/22* (2013.01); *H04Q 11/0066* (2013.01); *H04Q 2011/0073* (2013.01); *H04Q 2011/0086* (2013.01)

(58) Field of Classification Search
CPC . H04L 41/0896; H04L 41/22; H04L 41/0686; H04Q 11/0066; H04Q 2011/0073; H04Q 2011/0086; H04B 10/07955
See application file for complete search history.

(56) References Cited

U.S. PATENT DOCUMENTS

2014/0006956 A1   1/2014   Huliyar et al.
2015/0033137 A1   1/2015   Nagarajan et al.

OTHER PUBLICATIONS

U.S. Appl. No. 14/514,801, filed Oct. 2014, Nagarajan et al.

*Primary Examiner* — Leslie Pascal
(74) *Attorney, Agent, or Firm* — Harrity & Harrity LLP; David L. Soltz

(57) ABSTRACT

A device may receive optical network information associated with a plurality of super-channels. Each super-channel, of the plurality of super-channels, may include a plurality of optical channels transported as a single optical channel. The device may assign the plurality of super-channels to a plurality of sets of super-channels. The device may receive a request for a subset of the optical network information associated with a set of super-channels of the plurality of sets of super-channels. The device may provide, based on the request, information that identifies the subset of the optical network information associated with the set of super-channels via a user interface.

20 Claims, 8 Drawing Sheets

… (1)

DIGITAL LINK VIEWER WITH PAGING FOR SUPER-CHANNELS

RELATED APPLICATION

This application claims priority under 35 U.S.C. §119 to Indian Provisional Patent Application No. 3925/CHE/2015, filed on Jul. 30, 2015, the content of which is incorporated by reference herein in its entirety.

BACKGROUND

In optical networks, signals may be transmitted at various wavelengths, with each wavelength corresponding to a transmission channel. Optical links may connect network nodes so that signals may be transmitted throughout the optical network. An optical route may use a series of network nodes and optical links to connect a source of an optical transmission with a destination for the optical transmission.

SUMMARY

According to some possible implementations, a device may receive optical network information associated with a plurality of super-channels. Each super-channel, of the plurality of super-channels, may be formed from a plurality of optical channels simultaneously transported as a single optical channel. The device may identify a quantity of the plurality of super-channels based on the optical network information, and may assign the plurality of super-channels to a plurality of sets of super-channels based on the quantity. Each set, of the plurality of sets of super-channels, may include one or more super-channels of the plurality of super-channels. At least two sets, of the plurality of sets of super-channels, may include two or more super-channels of the plurality of super-channels. The device may receive a request for a subset of the optical network information associated with a particular set of super-channels of the plurality of sets of super-channels. The device may provide, based on the request, information that identifies the subset of the optical network information associated with the particular set of super-channels via a user interface.

According to some possible implementations, a non-transitory computer-readable medium may store instructions that, when executed by one or more processors, cause the one or more processors to receive optical network information associated with a plurality of super-channels. Each super-channel, of the plurality of super-channels, may include a plurality of optical channels transported as a single optical channel. The instructions may cause the one or more processors to assign the plurality of super-channels to a plurality of groups of super-channels. Each group, of the plurality of groups of super-channels, may be associated with at least one super-channel of the plurality of super-channels. At least two groups, of the plurality of groups of super-channels, may include two or more super-channels of the plurality of super-channels. The instructions may cause the one or more processors to receive a request for a portion of the optical network information associated with a particular group of super-channels of the plurality of groups of super-channels. The instructions may cause the one or more processors to identify the portion of the optical network information relating to one or more super-channels in the particular group of super-channels. The instructions may cause the one or more processors to provide, via a user interface, the portion of the optical network information relating to the one or more super-channels in the particular group of super-channels based on the request.

According to some possible implementations, a method may include receiving, by a device, optical network information associated with a plurality of super-channels. Each super-channel, of the plurality of super-channels, may include a plurality of optical channels transported together as a single optical channel. The method may include identifying, by the device, a quantity of the plurality of super-channels based on receiving the optical network information. The method may include assigning, by the device, the plurality of super-channels to a plurality of sets of super-channels based on the quantity. Each set, of the plurality of sets of super-channels, may be associated with one or more super-channels of the plurality of super-channels. At least two sets, of the plurality of sets of super-channels, may include two or more super-channels of the plurality of super-channels. The method may include receiving, by the device and based on a user interaction with a user interface, a request that includes information relating to a particular set of super-channels of the plurality of sets of super-channels. The method may include identifying, by the device, a portion of the optical network information relating to the particular set of super-channels. The method may include providing, by the device and via the user interface, the portion of the optical network information relating to the particular set of super-channels.

DETAILED DESCRIPTION

Figure 1:
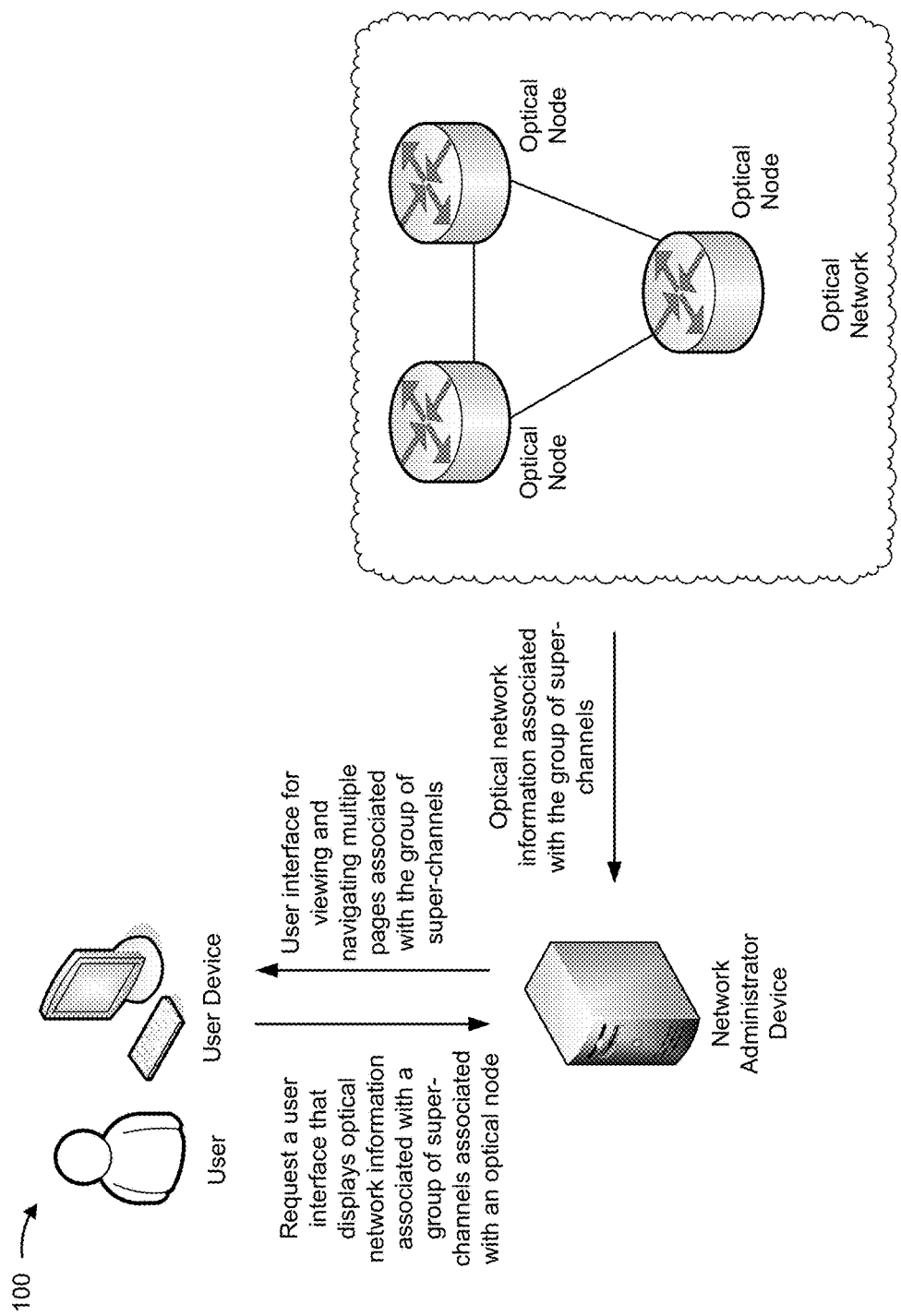
FIG. 1 is a diagram of an overview of an example implementation described herein.

The following detailed description of example implementations refers to the accompanying drawings. The same reference numbers in different drawings may identify the same or similar elements.

Administrators and/or users of an optical network may want to determine information associated with the optical network, such as diagnostic information that may be used to diagnose and/or correct problems associated with the optical network. Optical network information may include a wide variety of information, such as information associated with an optical link, an optical node, an optical component, an optical super-channel, an optical channel, or the like.

An optical super-channel may include multiple optical channels multiplexed together, using wavelength-division multiplexing, for transmission as a single optical channel. A difference between an optical super-channel and a wavelength division multiplexed (WDM) signal is the channel gap. With an optical super-channel, the channel gap between optical channels is reduced relative to a WDM signal (i.e., the optical channels are more tightly packed in a super-channel than a WDM signal). The channel gap, for an optical super-channel, may be approximately equal to the Nyquist bandwidth (i.e., a channel gap that approximates the baud rate). Such a channel gap can be achieved with techniques, such as orthogonal-band-multiplexed (OBM)-orthogonal frequency division multiplexing (OFDM), no guard interval (NGI)-OFDM, Nyquist WDM, multi-channel equalization (MCE)-WDM, or the like.

In some implementations, an optical super-channel may be generated using a single line card. In some implementations, an optical super-channel may be generated using a single chip. In some implementations, an optical super-channel may be generated using a single photonic integrated circuit (PIC). In some implementations, an optical super-channel may be generated using a single PIC on a single line card with a single fiber-optic connector. In some implementations, an optical super-channel may be used with coherent modulation. In some implementations, an optical super-channel may be provisioned in a single operational cycle. Various quantities of the optical channels may be combined into optical super-channels using various modulation formats to create different optical super-channel types having different characteristics. Each optical channel may originate from a respective optical source (e.g., a laser source) and possibly a respective optical modulator. The use of optical super-channels enables scale, ease of deployment, and more efficient use of spectrum. Optical super-channels are discussed in more detail below in connection with FIGS. 2A and 2C.

Implementations described herein provide a user interface with multiple pages for viewing optical network information associated with one or more groups of super-channels used by the optical network. By providing the groups of super-channels via different pages (e.g., providing paging for super-channels), the information associated with the super-channels may be provided in a less cluttered and more easy to read manner. The presentation of the optical network information may allow a network operator to diagnose issues with the optical network more easily, thereby making the optical network more efficient. Furthermore, by allowing the user to diagnose issues more quickly, the user may have less interaction with the optical network, therefore saving processor and memory resources of the optical network.

FIG. 1 is a diagram of an overview of an example implementation 100 described herein. As shown in FIG. 1, a user interacting with a user device (e.g., a desktop computer, a laptop computer, etc.) may request, from a network administrator device (e.g., a server, a network device, etc.), a user interface that presents optical network information associated with a group of super-channels associated with an optical node. The group of super-channels may be a subset of all of the super-channels capable of carrying information via an optical network. The network administrator device may receive the optical network information, associated with the group of super-channels, from one or more optical nodes in an optical network (or may retrieve the optical network information from memory), and may provide, to the user device, the user interface for viewing and navigating multiple pages associated with the group of super-channels.

Implementations described herein provide a user interface for viewing and navigating multiple pages of optical network information associated with corresponding groups of super-channels. The optical network information associated with the group of super-channels may include information associated with an optical route associated with a super-channel (e.g., optical nodes associated with the super-channel, optical links associated with the super-channel, and/or the like). Furthermore the optical network information may include attributes about the group of super-channels. By showing only one group of super-channels, out of multiple groups, at a time, the user interface is less cluttered and presents information more clearly. The optical network information may be used to determine if the optical network is correctly configured or is experiencing technical issues, allowing operators to troubleshoot and repair issues in the optical network. Therefore, implementations described herein improve the operation of the optical network and of optical devices operating in the optical network by making the optical network operate more efficiently and with fewer configuration issues.

Figure 2A:
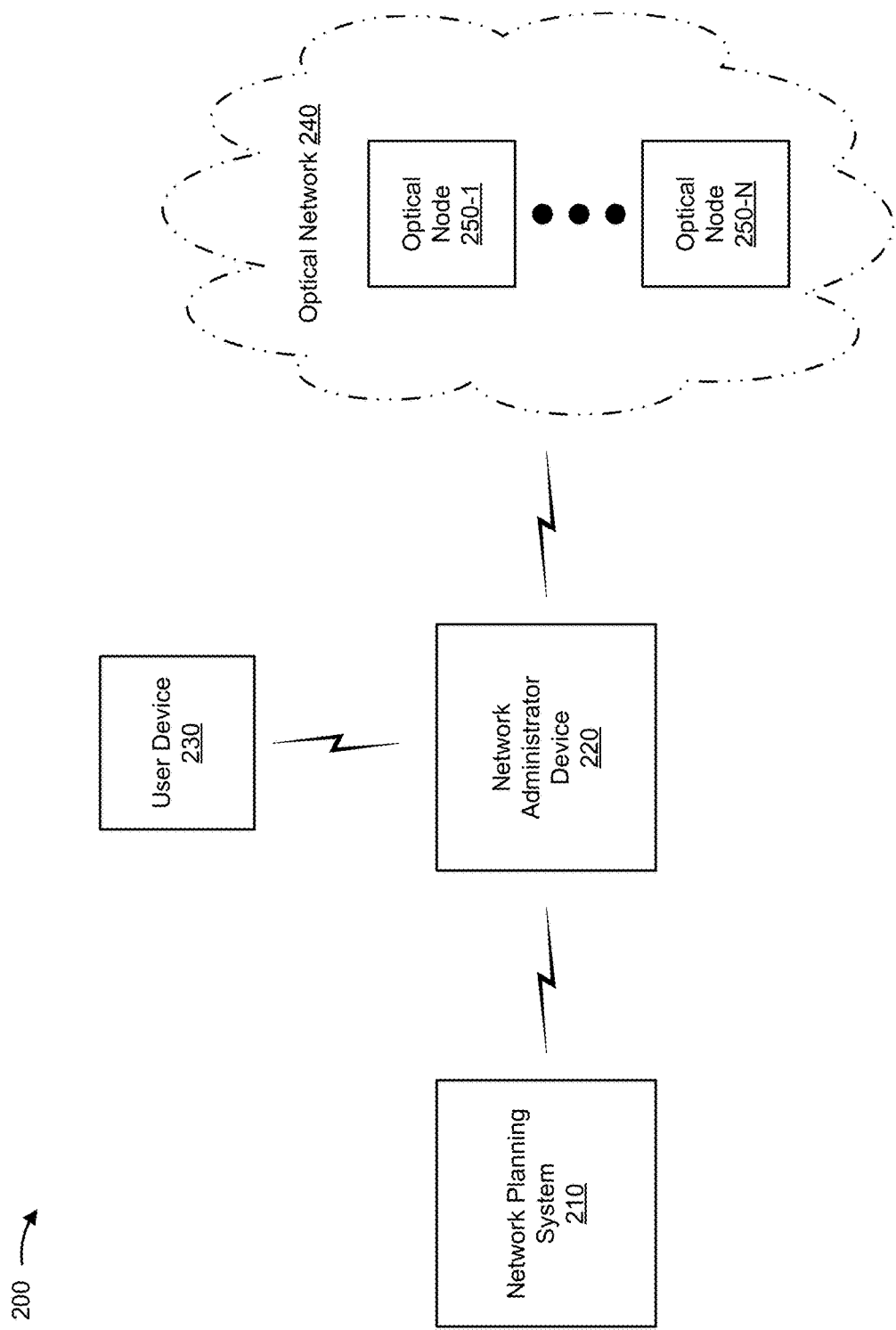
FIG. 2A is a diagram of an example environment in which systems and/or methods, described herein, may be implemented.

FIG. 2A is a diagram of an example environment 200 in which systems and/or methods, described herein, may be implemented. As shown in FIG. 2A, environment 200 may include a network planning system 210, a network administrator device 220, a user device 230, and an optical network 240, which may include a set of optical nodes 250-1 through 250-N (N≥1) (hereinafter referred to individually as "optical node 250," and collectively as "optical nodes 250"). Devices of environment 200 may interconnect via wired connections, wireless connections, or a combination of wired and wireless connections.

Network planning system 210 may include one or more devices capable of receiving, generating, storing, processing, and/or providing optical network information. For example, network planning system 210 may include a computing device, such as a server or a similar type of device. Network planning system 210 may assist a user in modeling and/or planning an optical network, such as optical network 240. For example, network planning system 210 may assist in modeling and/or planning an optical network configuration, which may include quantities, locations, capacities, parameters, and/or configurations of optical nodes 250, characteristics and/or configurations (e.g., capacities) of optical links between optical nodes 250, traffic demands of optical nodes 250 and/or optical links between optical nodes 250, and/or any other network information associated with optical network 240 (e.g., optical node configurations, digital device configurations, etc.). Network planning system 210 may provide optical network information, associated with optical network 240, to network administrator device 220 so that a user may view, modify, and/or interact with the optical network information.

Network administrator device 220 may include one or more devices capable of receiving, generating, storing, processing, and/or providing optical network information. For example, network administrator device 220 may include a computing device, such as a server, a desktop computer, a laptop computer, or the like. In some implementations, network administrator device 220 may receive optical network information (e.g., from one or more devices shown in FIG. 2A), and may provide the optical network information for display via a user interface. Additionally, or alternatively, network administrator device 220 may provide the optical network information to another device, such as user device 230, for display via a user interface. In some implementations, network administrator device 220 may receive (e.g., from user device 230) information associated with a modification to optical network 240, and may provide information associated with the modification to optical network 240 and/or optical nodes 250 to configure optical network 240 based on the modification.

User device 230 may include one or more devices capable of receiving, generating, storing, processing, and/or providing optical network information. For example, user device 230 may include a computing device, such as a desktop computer, a laptop computer, a tablet computer, a mobile phone (e.g., a smart phone, a radiotelephone, etc.), a handheld computer, or the like. In some implementations, user device 230 may receive optical network information from and/or transmit information to another device in environment 200. User device 230 may provide the optical network information for display via multiple pages (e.g., a page may correspond to a group of super-channels 265 associated with an optical node 250). In some implementations, user device 230 may receive user input to modify optical network information, and may provide the modified optical network information to an optical node 250 (e.g., via network administrator device 220) to cause the modification to be implemented in optical network 240.

Optical network 240 may include any type of network that uses light as a transmission medium. For example, optical network 240 may include a fiber-optic based network, an optical transport network, a light-emitting diode network, a laser diode network, an infrared network, and/or a combination of these or other types of optical networks. Optical network 240 may include one or more optical routes (e.g., optical lightpaths), that may specify a path along which light is carried (e.g., using one or more optical links) between two or more optical nodes 250. An optical link may include an optical fiber, an optical channel, an optical super-channel, a super-channel group, an optical carrier group, a set of spectral slices, an optical control channel, an optical data channel, or the like.

In some implementations, an optical link may include a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Optical node 250 may include one or more devices capable of receiving, generating, storing, processing, and/or providing data, carried by an optical signal, via an optical link. For example, optical node 250 may include one or more optical data processing and/or optical traffic transfer devices, such as an optical amplifier (e.g., a doped fiber amplifier, an erbium doped fiber amplifier, a Raman amplifier, etc.), an optical add-drop multiplexer ("OADM") (e.g., a reconfigurable optical add-drop multiplexer ("ROADM"), a flexibly reconfigurable optical add-drop multiplexer ("FROADM"), etc.), an optical source device (e.g., a laser source), an optical destination device (e.g., a laser sink), an optical multiplexer, an optical demultiplexer, an optical transmitter, an optical receiver, an optical transceiver, a photonic integrated circuit, an integrated optical circuit, or the like. In some implementations, optical node 250 may include one or more optical components. Optical node 250 may process and/or transmit an optical signal (e.g., to other optical node 250 via an optical link) to deliver the optical signal through optical network 240.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

Figure 2B:
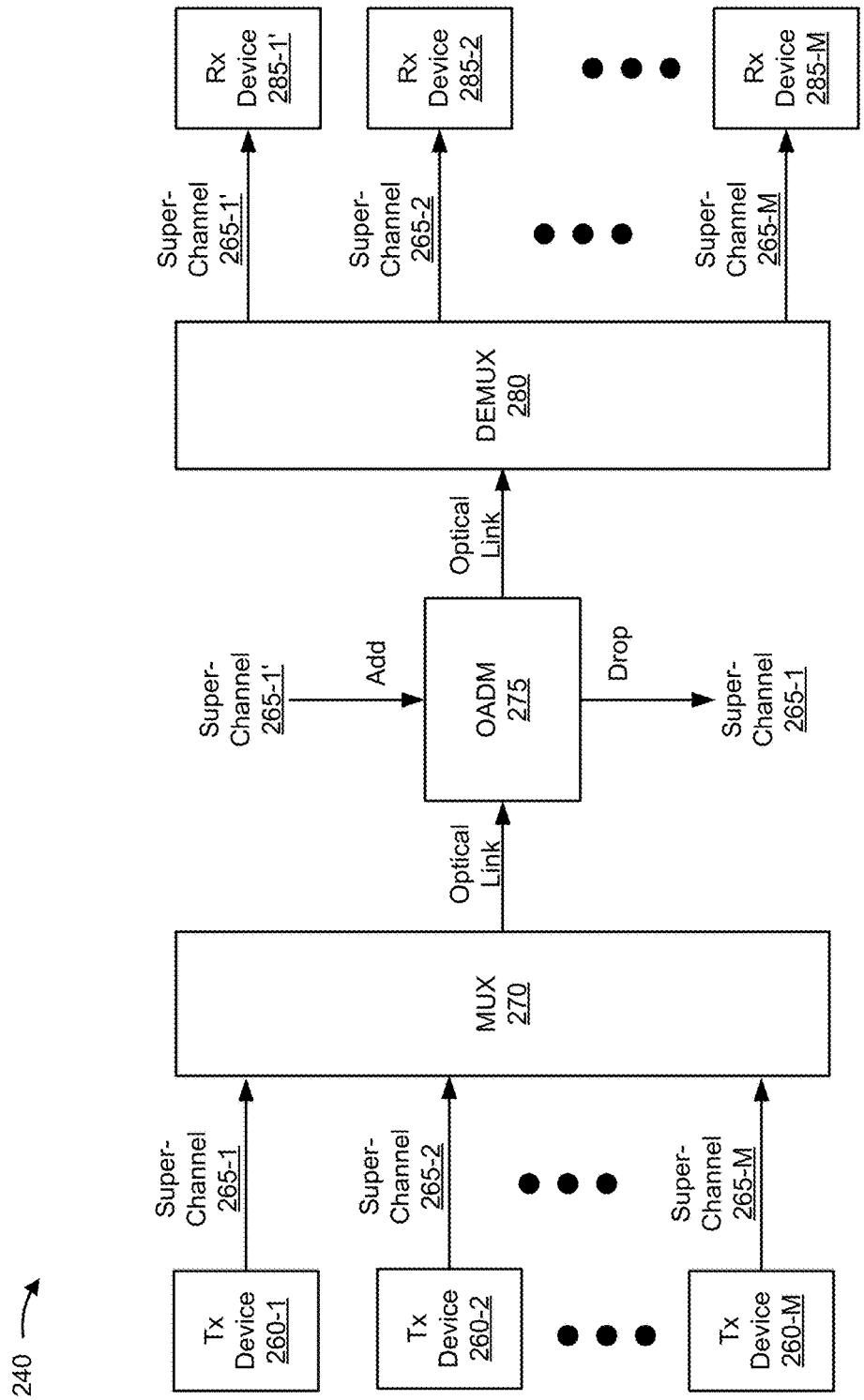
FIG. 2B is a diagram of example devices of an optical network that may be monitored and/or configured according to implementations described herein.

FIG. 2B is a diagram of example devices of optical network 240 that may be monitored and/or configured according to implementations described herein. One or more devices shown in FIG. 2B may operate within optical network 240, and may correspond to one or more optical nodes 250 and/or one or more optical components of an optical node 250. As shown, optical network 240 may include a set of optical transmitter devices 260-1 through 260-M (M≥1) (hereinafter referred to individually as "Tx device 260," and collectively as "Tx devices 260"), a set of super-channels 265-1 through 265-M (M≥1) (hereinafter referred to individually as "super-channel 265," and collectively as "super-channels 265"), a multiplexer ("MUX") 270, an OADM 275, a demultiplexer ("DEMUX") 280, and one or more optical receiver devices 285-1 through 285-M (M≥1) (hereinafter referred to individually as "Rx device 285," and collectively as "Rx devices 285").

Tx device 260 may include, for example, an optical transmitter and/or an optical transceiver that generates an optical signal. One or more optical signals may be carried via super-channel 265. In some implementations, a single Tx device 260 may be associated with a single super-channel 265. Additionally, or alternatively, a single Tx device 260 may be associated with multiple super-channels 265, or multiple Tx devices 260 may be associated with a single super-channel 265.

Super-channel 265 may include multiple channels multiplexed together using wavelength-division multiplexing to increase transmission capacity. Various quantities of channels may be combined into super-channels using various modulation formats to create different super-channel types having different characteristics. Additionally, or alternatively, an optical link may include a super-channel group. A super-channel group may include multiple super-channels multiplexed together using wavelength-division multiplexing to increase transmission capacity. Super-channel 265 is described in more detail herein in connection with FIG. 2C.

Multiplexer 270 may include, for example, an optical multiplexer that combines multiple input super-channels 265 for transmission over an output fiber. For example, multiplexer 270 may combine super-channels 265-1 through 265-M, and may provide the combined super-channels 265 to OADM 275 via an optical link (e.g., a fiber).

OADM 275 may include, for example, a ROADM, a FROADM, or the like. OADM 275 may multiplex, demultiplex, add, drop, and/or route multiple super-channels 265 into and/or out of a fiber (e.g., a single mode fiber). As illustrated, OADM 275 may drop super-channel 265-1 from a fiber, and may allow super-channels 265-2 through 265-M to continue propagating toward Rx device 285. Dropped super-channel 265-1 may be provided to a device (not shown) that may demodulate and/or otherwise process super-channel 265-1 to output the data stream carried by super-channel 265-1. As illustrated, super-channel 265-1 may be provisioned for transmission from Tx device 260-1 to OADM 275, where super-channel 265-1 may be dropped. As further shown, OADM 275 may add super-channel 265-1' (e.g., 265-1$^{Prime}$) to the fiber. Super-channel 265-1' may include one or more optical carriers (e.g., one or more channels) at the same or substantially the same wavelengths as super-channel 265-1. Super-channel 265-1' and super-channels 265-2 through 265-M may propagate to demultiplexer 280.

Demultiplexer 280 may include, for example, an optical de-multiplexer that separates multiple super-channels 265 carried over an input fiber. For example, demultiplexer 280 may separate super-channels 265-1' and super-channels 265-2 through 265-M, and may provide each super-channel 265 to a corresponding Rx device 285.

Rx device 285 may include, for example, an optical receiver and/or an optical transceiver that receives an optical signal. One or more optical signals may be received by Rx device 285 via super-channel 265. Rx device 285 may convert a super-channel 265 into one or more electrical signals, which may be processed to output information associated with each data stream carried by an optical carrier (e.g., a channel) included in super-channel 265. In some implementations, a single Rx device 285 may be associated with a single super-channel 265. Additionally, or alternatively, a single Rx device 285 may be associated with multiple super-channels 265, or multiple Rx devices 285 may be associated with a single super-channel 265.

The number and arrangement of devices shown in FIG. 2B are provided as an example. In practice, there may be additional devices, fewer devices, different devices, or differently arranged devices, included in optical network 240, than those shown in FIG. 2B. Furthermore, two or more devices shown in FIG. 2B may be implemented within a single device, or a single device shown in FIG. 2B may be implemented as multiple, distributed devices. Additionally, or alternatively, a set of devices shown in FIG. 2B may perform one or more functions described as being performed by another set of devices shown in FIG. 2B.

Figure 2C:
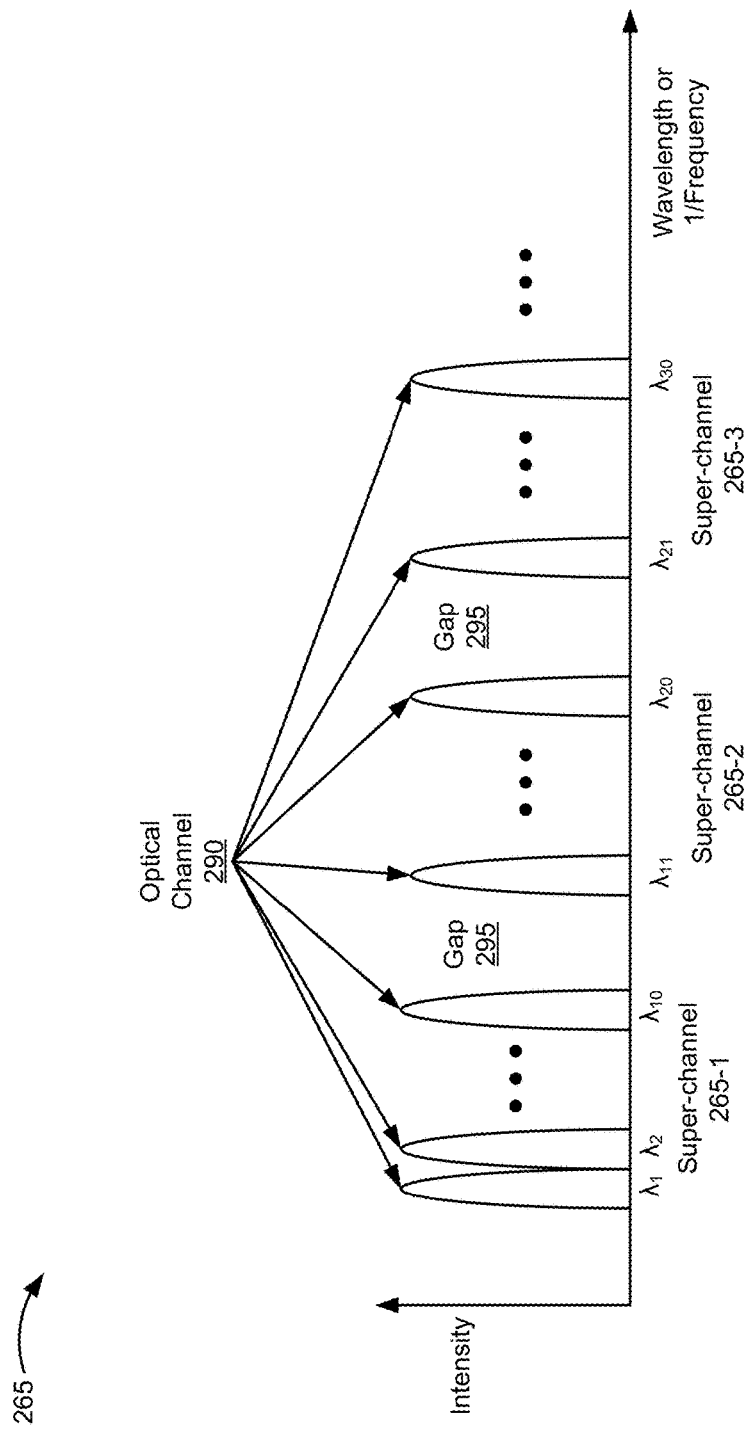
FIG. 2C is a diagram of example super-channels that may be monitored and/or configured according to implementations described herein.

FIG. 2C is a diagram of example super-channels 265 that may be monitored and/or configured according to implementations described herein. A super-channel may refer to multiple optical carriers (e.g., multiple optical channels) that are simultaneously transported, as a single optical channel, over the same optical waveguide (e.g., a single mode optical fiber). Each optical carrier included in a super-channel may be associated with a particular optical wavelength (or set of optical wavelengths). The multiple optical carriers may be combined to create a super-channel using wavelength division multiplexing. For example, the multiple optical carriers may be combined using dense wavelength division multiplexing, in which carrier-to-carrier spacing may be less than 1 nanometer. In some implementations, each optical carrier may be modulated to carry an optical signal.

FIG. 2C shows an example frequency and/or wavelength spectrum associated with super-channels 265. In some implementations, the frequency and/or wavelength spectrum may be associated with a particular optical spectrum (e.g., C Band, C+ Band, CDC Band, etc.). As shown, super-channel 265-1 may include multiple optical carriers 290, each of which corresponds to a wavelength λ (e.g., $\lambda_1$, $\lambda_2$, through $\lambda_{10}$) within a first wavelength band. Similarly, super-channel 265-M may include multiple optical carriers 290, each of which corresponds to a wavelength λ (e.g., $\lambda_{Y-X}$ through $\lambda_Y$) within a second wavelength band. The quantity of depicted optical carriers 290 per super-channel 265 is provided as an example. In practice, super-channel 265 may include any quantity of optical carriers 290. In some implementations, optical node 250 may be associated with multiple super-channels 265 (e.g., super-channels 265 used by optical node 250). These super-channels 265 may be separated by a channel gap 295, which is a spacing between successive super-channels 265. In some implementations, this spacing between successive super-channels 265 may be uniform. In some implementations, this spacing between successive super-channels 265 may be non-uniform.

Optical carrier 290 may be associated with a particular frequency and/or wavelength of light. In some implementations, optical carrier 290 may be associated with a frequency and/or wavelength at which the intensity of light carried by optical carrier 290 is strongest (e.g., a peak intensity, illustrated by the peaks on each optical carrier 290). In some implementations, optical carrier 290 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., $\lambda_1$ and $\lambda_2$) may be equal to or substantially equal to a bandwidth (or bit rate) associated with a data stream carried by optical carrier 290. For example, assume that each optical carrier 290 included in super-channel 265-1 (e.g., $\lambda_1$ through $\lambda_{10}$) is associated with a 50 Gigabit per second ("Gbps") data stream. In this example, super-channel 265-1 may have a collective data rate of 500 Gbps (e.g., 50 Gbps×10). In some implementations, the collective data rate of super-channel 265 may be greater than or equal to 100 Gbps. Additionally, or alternatively, the spacing between adjacent wavelengths may be non-uniform, and may vary within a particular super-channel band (e.g., super-channel 265-1). In some implementations, optical carriers 290 included in super-channel 265 may be non-adjacent (e.g., may be associated with non-adjacent wavelengths in an optical spectrum).

Each super-channel 265 may be provisioned in optical network 240 as one optical channel and/or as an individual optical channel. Provisioning of an optical channel may include designating a route and/or path for the optical channel through optical network 240. For example, an optical channel may be provisioned to be transmitted via a set of optical nodes 250. In some implementations, optical nodes 250 may be configured as a ring. Additionally, or alternatively, optical nodes 250 may be configured in a point-to-point configuration. Provisioning may be referred to as "allocating" and/or "allocation" herein. Even though each super-channel 265 is a composite of multiple optical carriers 290, the optical carriers 290 included in super-channel 265 may be routed together through optical network 240. Additionally, or alternatively, super-channel 265 may be managed and/or controlled in optical network 240 as though it included one optical channel and/or one optical carrier at one wavelength.

The number and arrangement of super-channels and optical carriers shown in FIG. 2C are provided as an example. In practice, there may be additional super-channels and/or optical carriers, fewer super-channels and/or optical carriers, different super-channels and/or optical carriers, or differently arranged super-channels and/or optical carriers than those shown in FIG. 2C.

Figure 3:
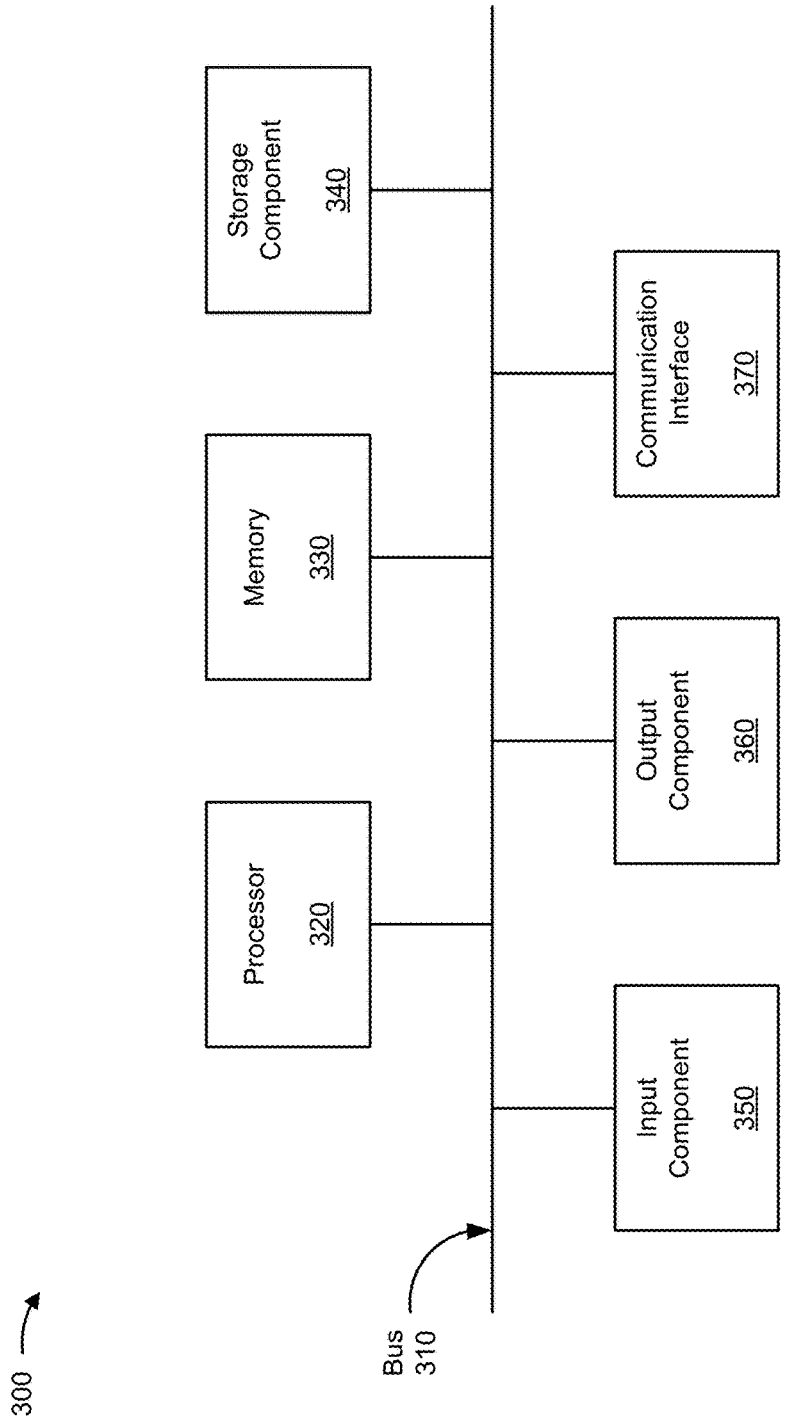
FIG. 3 is a diagram of example components of one or more devices and/or systems of FIG. 2A and/or FIG. 2B.

FIG. 3 is a diagram of example components of a device 300. Device 300 may correspond to network planning system 210, network administrator device 220, user device 230, and/or optical node 250. In some implementations, network planning system 210, network administrator device 220, user device 230, and/or optical node 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
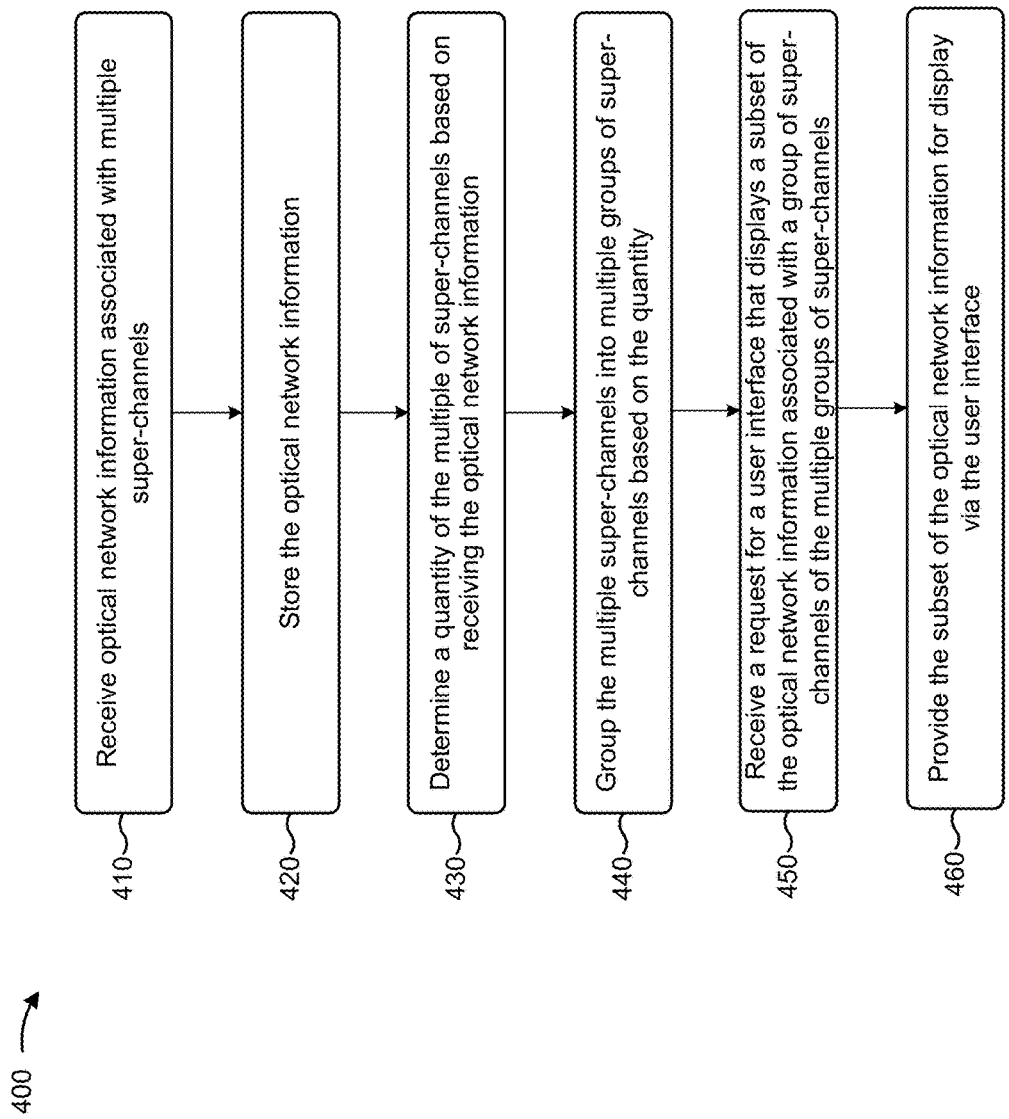
FIG. 4 is a flow chart of an example process for receiving and storing optical network information associated with multiple super-channels, and providing the optical network information via a user interface.

FIG. 4 is a flow chart of an example process 400 for receiving and storing optical network information associated with multiple super-channels, and providing the optical network information via a user interface. In some implementations, one or more process blocks may be performed by network administrator device 220. In some implementations, one or more process blocks of FIG. 4 may be performed by another device or a group of devices separate from or including network administrator device 220, such as network planning system 210, user device 230, and/or optical node 250.

As shown in FIG. 4, process 400 may include receiving optical network information associated with multiple super-channels (block 410). For example, network administrator device 220 may receive optical network information (e.g., from network planning system 210, optical node 250, etc.) associated with multiple super-channels 265. In some implementations, the multiple super-channels 265 may be associated with optical node 250 (e.g., Tx device 260, MUX 270, OADM 275, DEMUX 280, Rx device 285, etc.).

In some implementations, network administrator device 220 may request and/or receive the optical network information on a periodic basis (e.g., every second, every minute, every hour, every day, every week, etc.). Additionally, or alternatively, network administrator device 220 may request and/or receive the optical network information based on input received from a user (e.g., a user request for the optical network information). Additionally, or alternatively, network planning system 210 and/or optical node 250 may automatically provide the optical network information to network administrator device 220 (e.g., on a periodic basis, when the optical network information is modified, etc.).

Optical network information may include information associated with optical node 250 and/or the multiple super-channels 265. In some implementations, super-channel 265 may be associated with an optical route. For example, super-channel 265 may be associated with an optical node 250 that is a source of an optical signal carried on super-channel 265 and an optical node 250 that is a destination of the optical signal. Additionally, or alternatively, super-channel 265 may be associated with one or more optical nodes 250 that are possible destinations of the optical signal based on where optical node 250 sends the optical signal. Optical network information may include information about the optical route that identifies a source, a destination, and/or one or more possible destinations of the optical signal carried by super-channel 265. Furthermore, optical network information may include information about optical links between optical nodes 250 (e.g., source nodes, destination nodes, intermediate nodes, etc.).

Additionally, or alternatively, the optical network information associated with the multiple super-channels 265 may include information that identifies characteristics of super-channel 265 at optical node 250. The information that identifies characteristics of super-channel 265 at optical node 250 may include a channel identifier of super-channel 265, one or more spectral slices associated with super-channel 265, optical power received via super-channel 265 at optical node 250, optical power transmitted via super-channel 265 at optical node 250, an alarm associated with super-channel 265, a service state of super-channel 265, or the like.

As further shown in FIG. 4, process 400 may include storing the optical network information (block 420). For example, network administrator device 220 may store the optical network information in a memory accessible by network administrator device 220. In some implementations, network administrator device 220 may store the information using a data structure. In some implementations, network administrator device 220 may store the optical network information in a way to identify a relationship between optical node 250 (e.g., using an optical node identifier) and super-channels associated with the optical node. In some implementations, network administrator device 220 may store the optical network information in a searchable format to permit the optical network information to be searched, filtered, or the like.

As further shown in FIG. 4, process 400 may include determining a quantity of the multiple super-channels based on the optical network information (block 430). For example, network administrator device 220 may determine a quantity of super-channels 265 based on the optical network information. Network administrator device 220 may determine the quantity of super-channels 265 based on channel identifiers associated with the super-channels 265. Additionally, or alternatively, the optical network information may be structured in such a way as to delineate each super-channel 265, allowing network administrator device 220 to determine the quantity through the delineation.

In some implementations, network administrator device 220 may determine a quantity of super-channels 265 based on user input. For example, a user may request optical network information associated with a particular optical node 250 (e.g. by identifying optical node 250). Network administrator device 220 may determine the quantity of super-channels 265 associated with optical node 250 based on information that identifies optical node, based on optical network information, and/or based on searching the data structure using the optical node identifier. Additionally, or alternatively, network administrator device 220 may determine, using a similar method, the quantity of super-channels 265 associated with an optical link between two optical nodes 250 and/or an optical route among multiple optical nodes 250.

As further shown in FIG. 4, process 400 may include grouping the multiple super-channels into multiple groups of super-channels based on the quantity (block 440). For example, network administrator device 220 may group the multiple super-channels 265 into multiple groups of super-channels 265 based on the quantity. In some implementations, network administrator device 220 may divide the multiple super-channels 265 evenly into multiple groups of a particular size (e.g., groups that include ten super-channels 265, groups that include nineteen super-channels 265, etc.) using group identifiers. Additionally, or alternatively, the groups of super-channels 265 may include a group with a remainder of super-channels 265 that is less than the particular size and left over from forming groups of the particular size (e.g., a final group of super-channels 265).

In some implementations, the groups may be formed using super-channels 265 that have sequential channel identifiers, associated characteristics, or a combination of sequential channel identifiers and associated characteristics (e.g., sequential super-channels 265 in a frequency slot plan). In some implementations, each super-channel 265 may be associated with a group identifier corresponding to the group to which super-channel 265 is assigned. In some implementations, the super-channels 265 associated with a single group may be presented on a single page of a user interface. Additionally, or alternatively, super-channels 265 of different groups may be presented on different pages of a user interface, as described below.

In some implementations, the groups of super-channels may include nineteen super-channels 265. A common frequency slot plan, such as a 250 GHz frequency slot plan may include nineteen super-channels 265. When the frequency slot plan is less than 250 GHz, the frequency slot plan may include more than nineteen super-channels. Therefore, using nineteen super-channels 265 may serve as a good size to group super-channels 265.

As further shown in FIG. 4, process 400 may include receiving a request for a user interface that presents a subset of the optical network information associated with a group of super-channels of the multiple groups of super-channels (block 450). For example, network administrator device 220 may receive a request (e.g., based on user input) for the user interface that presents a subset (e.g., a portion) of the optical network information associated with a group of super-channels 265, of the one or more groups of super-channels 265, associated with optical node 250. In some implementations, a user may provide input that identifies the group of super-channels 265 (e.g., by selecting the group of super-channels 265 using a group identifier, by identifying an optical node 250, by identifying multiple optical nodes 250, by identifying an optical link between optical nodes 250, by selecting a page with which the group of super-channels have been associated, etc.).

In some implementations, the user may provide user input to identify the group of super-channels 265 in different ways. For example, the user may provide user input to identify a group of super channels by identifying optical node 250, multiple optical nodes 250, an optical link between optical nodes 250, or the like. Additionally, or alternatively, the user may be able to identify a particular group of super-channels 265 from a user interface that presents information associated with optical node 250. An example of a user interface is described in more detail below.

As further shown in FIG. 4, process 400 may include providing the subset of the optical network information for display via the user interface (block 460). For example, network administrator device 220 may provide the subset of the optical network information for display via a user interface. Additionally, or alternatively, network administrator device 220 may provide the subset of the optical network information to another device (e.g., user device 230) for display via a user interface. In some implementations, the user interface may be divided into different sections (e.g., pages, windows, tabs, frames, areas, etc.), and each section may provide information associated with a different group of super-channels 265. Additionally, or alternatively, user device 230 may have multiple user interfaces. A first user interface may present information associated with a first group of super-channels, and a second user interface may present information associated with a second group of super-channels.

In some implementations, optical network information associated with a first group of super-channels 265, of the multiple groups of super-channels 265, may be not be presented in the user interface when optical network information associated with a second group of super-channels 265 is being presented in the user interface. In other words, in some implementations, the user interface may present only one page or section related to a group of super-channels 265 at a time.

In some implementations, the user interface may present a page that provides high-level summary information relating to the multiple super-channels 265 (e.g., the total quantity of super-channels 265 included in the multiple groups of super-channels 265), optical nodes associated with the super-channels 265, optical links associated with the super-channels 265, spectral slices used by the super-channels 265, and/or the like. The page may also provide characteristics of super-channels 265, the optical nodes, and/or the optical links.

In some implementations, when the user interface is presenting a first page with optical network information for a first group of super-channels 265, the user interface may provide access, via the user interface, to a second page that presents optical network information for a second group of super-channels 265, which is also associated with optical node 250. The second page may be similar to the first page (e.g., may provide similar optical network information), and may allow access back to the first page. For example, a user may interact with one or more input mechanisms to navigate between pages associated with different groups of super-channels 265, as described in more detail elsewhere herein.

In this way, the user interface may provide optical network information associated with a group of super-channels 265 associated with optical node 250. By presenting optical network information associated with a subset of super-channels 265 as opposed to presenting optical network information associated with every super-channel 265 or a larger set of super-channels 265 associated with optical node 250, the user may be able to more easily and clearly diagnose a problem associated with optical network 240. Therefore, the user may have less interaction with optical network 240 when diagnosing a problem, therefore saving processor and memory resources of the optical network. Furthermore, optical network 240 may run more efficiently and optical network 240 resources may minimize issues that can be diagnosed and corrected on optical network 240 with the use of the user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
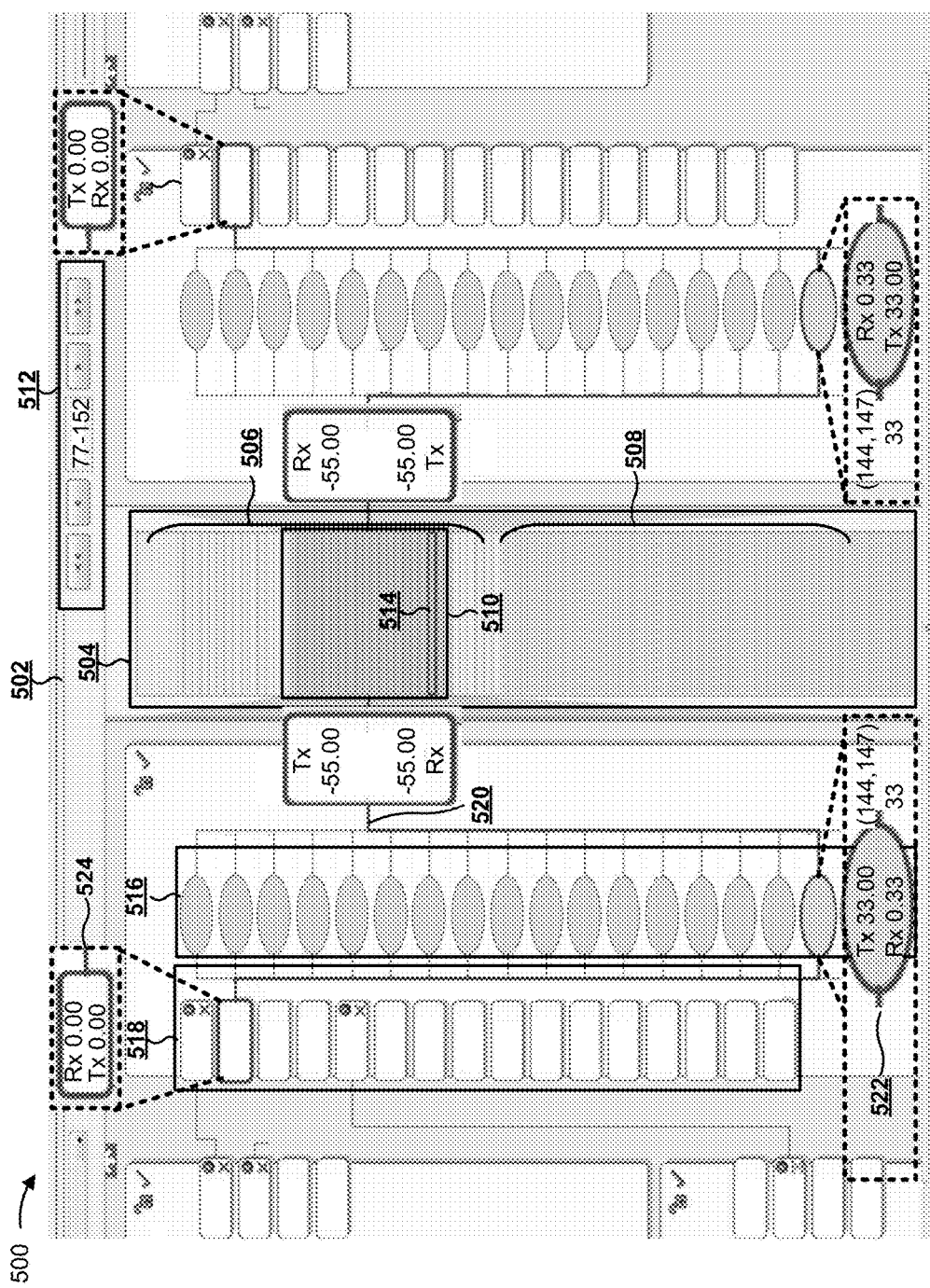
FIGS. 5A and 5B are diagrams of an example implementation relating to the example process shown in FIG. 4.
Figure 5B:
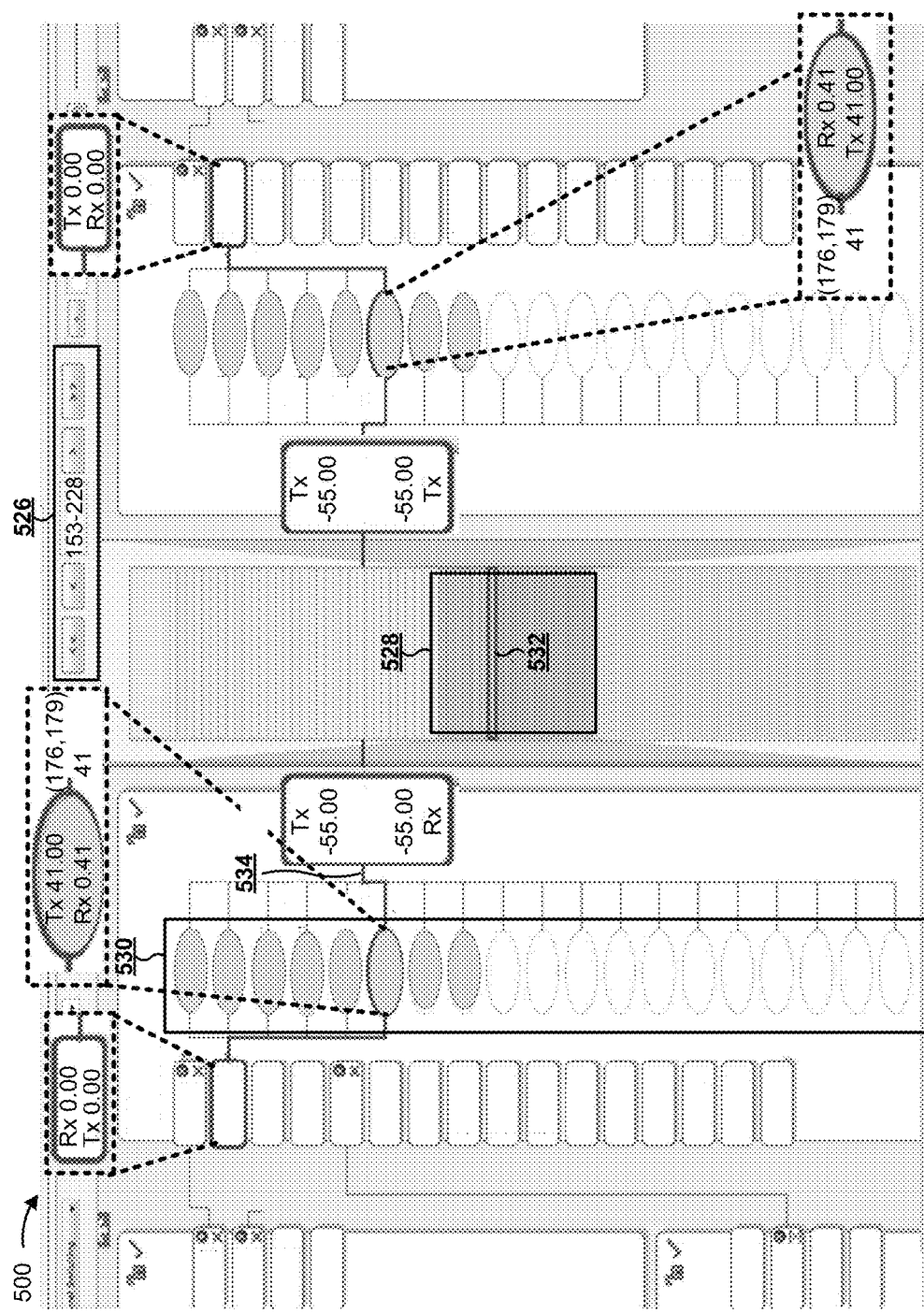

FIGS. 5A and 5B are diagrams of an example implementation 500 relating to example process 400 shown in FIG. 4. FIGS. 5A and 5B show example user interfaces for providing optical network information associated with a group of super-channels.

Assume that a user requests, via user device 230, optical network information associated with an optical node 250 (e.g., OADM 275). As shown in FIG. 5A, and by reference number 502, network administrator device 220 may provide, to user device 230, a user interface that presents optical network information associated with a group of super-channels associated with optical node 250. As shown by reference number 504, the user interface includes a spectrum representation of the entire available spectrum. The spectrum representation includes multiple sets of spectral slices and multiple super-channels associated with optical links between optical node 250 and other optical nodes 250. As described elsewhere herein, a particular super-channel may include one or more spectral slices.

As shown by reference number 506, in this example, the spectral slices that have been provisioned for a super-channel are represented by rectangles (e.g., super-channel representations) with a larger size than rectangles representing spectral slices that have not been provisioned for a super-channel. As shown by reference number 508, spectral slices that have not been provisioned for any super-channel are represented by rectangles (e.g., spectral slice representations) with a smaller size than the rectangles that represent spectral slices of super-channels. The super-channel representations have a larger size than the spectral slice representations because the super-channel representations include more spectral slices than the spectral slice representations.

Representing provisioned and non-provisioned spectral slices by rectangles (e.g., the super-channel representations and the spectral slice representations) is just one manner of representing super-channels that have been provisioned form spectral slices, and spectral slices that have not been provisioned. A user interface may represent super-channels and non-provisioned spectral slices in other manners to visually distinguish the super-channels and the non-provisioned spectral slices.

As shown by reference number 510, in this example, the spectrum representation shows a number of highlighted super-channel representations (e.g., shown as highlighted rectangles), which have been provisioned with a set of spectral slices. The highlighted super-channel representations represent the super-channels for which optical network information is presented in the user interface, as described below. In some implementations, a user may select another group of super-channel representations on the spectrum representation (e.g., by clicking on the other group of super-channel representations, or the like) to access information associated with the other group of super-channels and cause the other-group of super-channel representations to be highlighted on the spectrum representation.

As shown by reference number 512, the user interface includes a page browser. The page browser provides a range of numbers indicating the spectral slices represented on the presented page of the user interface. As shown, the page provides information related to spectral slices numbered from 77 to 152. Thus, the page provides optical network information relating to 76 spectral slices, which are divided evenly into 19 super-channels, with 4 spectral slices per super-channel. These 19 super-channels are represented by the highlighted super-channel representations, described above in connection with reference number 510.

The page browser also allows a user to change the page presented by the user interface (e.g., an option to change the page) by using the arrows to page through different groups of the spectral slices and different groups of super-channels corresponding to the selected spectral slices. As shown by reference number 514, a particular super-channel representation is outlined (e.g., which may indicate that a user has selected this particular super-channel representation, such as by clicking on the super-channel representation). Optical network information corresponding to the selected super-channel representation may also be outlined, as shown.

As shown by reference number 516, the user interface presents 19 super-channel information representations (e.g., ovals) (two of which are not shown in FIG. 5A) corresponding to the 19 super-channels representations highlighted in the spectrum representation. The super-channel information representations present optical network information, such as optical power associated with the super-channel, spectral slices associated with the super-channel, and a channel identifier. As shown by reference number 518, the user interface presents 16 optical device representations corresponding to optical devices associated with optical node 250. Each optical device is linked to optical node 250 through an optical link and may be associated with a particular super-channel. These optical devices have optical links to other optical nodes 250 shown to the left of the optical device representations.

As shown by reference number 520, the user interface highlights an optical route associated with the selected super-channel. The optical route is presented on the user interface by a thick line that connects a super-channel information representation and an optical device representation through a super-channel representation of optical node 250 (represented by the spectrum representation and the associated boxes flanking the spectrum representation) to another super-channel information representation and another optical device representation (e.g., one node is a source and another node is a destination).

As shown by reference number 522, the super-channel information representation associated with the optical route is connected to the thick line that represents the route, and the super-channel information representation is outlined in bold. The super-channel information representation includes information about the selected super-channel measured at an optical node 250 (and/or at an optical device within an optical node 250). For example, the super-channel information representation presents information that identifies the optical power transmitted and the optical power received. The optical power transmitted is represented by "Tx" and has a value of 33.00. The optical power received is represented by "Rx" and has a value of 0.33. The optical power transmitted or the optical power received may be represented in decibel watts (dBW), decibel milliwatts (dBm), or the like.

The super-channel information representation is also associated with information presented to the right and adjacent to the super-channel information representation in FIG. 5A. The information above the line, to the right, and adjacent to the super-channel information representation ("(144, 147)") indicates that super-channel is associated with spectral slices from 144 to 147. The information below the line, to the right, and adjacent to the super-channel information representation ("33") identifies the selected super-channel (e.g., is a channel identifier).

As shown by reference number 524, the optical device representation associated with the optical route is connected to the thick line and the optical device representation is outlined in bold. As shown, the optical device representation includes an optical power transmitted and an optical power received represented by "Tx" and "Rx" respectively which have a value of 0.00 in this example.

As shown in FIG. 5B, and by reference number 526, the user interface provides a page associated with spectral slices from 153 to 228. As shown by reference number 528, the spectral slice representations from 153 to 228 and super-channel representations associated with the spectral slices are highlighted on the spectrum representation. Most of the spectral slices from 153 to 228 are not associated with a super-channel (e.g., have not been provisioned). As shown by reference number 530, the user interface includes six super-channel representations that provide optical network information and 13 super-channel representations that are blank (e.g., that do not provide optical network information), which represents super-channels that may be provisioned from remaining spectral slices. As shown by reference number 532, a particular super-channel is a selected (e.g., is a selected super-channel). As shown by reference number 534, the optical route associated with the selected super-channel is presented within the user interface.

In some implementations, the optical device representation, optical node representations, and/or other representations on the user interface may be associated with an alarm state (e.g., an alert state) that indicates some issue with the setup of the component represented by the representation. A red X, as depicted in various locations in FIGS. 5A and 5B, may be displayed to indicate an alert. The alert may indicate that the component associated with the representation is misconfigured. Similarly, the user interface may display a green check mark, as depicted, in association with a representation (e.g., optical device representations, optical node representations, etc.) when the component associated with the representation is correctly configured.

By providing a group of super-channels, of the multiple super-channels associated with optical node 250, on the user interface, the user interface presents information related to optical node 250 and the super-channels associated with optical node 250 in a manner that allows the user to easily determine information of interest. Presenting the information in this manner allows a user, of the user interface, to access information necessary for troubleshooting more quickly and, therefore, allows optical network 240 to run more efficiently and with fewer issues.

As indicated above, FIGS. 5A and 5B are provided merely as an example. Other examples are possible and may differ from what was described with regard to FIGS. 5A and 5B.

Implementations described herein provide a user interface for viewing and navigating multiple pages of optical network information associated with corresponding groups of super-channels. The optical network information associated with the group of super-channels may include information associated with an optical route associated with a super-channel. Furthermore, the optical network information may include attributes about the group of super-channels. By showing only one group of super-channels, out of the multiple groups, at a time, the user interface is less cluttered and presents information clearly. The optical network information may be used to determine if the optical network is correctly configured or is experiencing technical issues, allowing operators to troubleshoot and repair issues in the optical network. Therefore, implementations described herein improve the operation of the optical network and improve the operation of optical devices operating in the optical network by making the optical network operate more efficiently and with fewer configuration issues.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is presented, and/or a set of configurations based on capabilities and/or specifications associated with a device on which the user interface is presented.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processors configured to:
        receive optical network information associated with a plurality of super-channels,
            each super-channel, of the plurality of super-channels, being formed from a plurality of optical channels simultaneously transported as a single optical channel;
        identify a quantity of the plurality of super-channels based on the optical network information;
        assign the plurality of super-channels to a plurality of sets of super-channels based on the quantity,
            each set, of the plurality of sets of super-channels, including one or more super-channels of the plurality of super-channels, and
            at least two sets, of the plurality of sets of super-channels, including two or more super-channels of the plurality of super-channels;
        receive a request for a subset of the optical network information associated with a particular set of super-channels of the plurality of sets of super-channels; and
        provide, based on the request, information that identifies the subset of the optical network information associated with the particular set of super-channels via a user interface.

2. The device of claim 1, where the request for the subset of the optical network information is generated using the user interface and identifies the particular set of super-channels.

3. The device of claim 1, where the subset of the optical network information is a first subset of the optical network information and the particular set of super-channels is a first set of super-channels; and
    where the one or more processors are further configured to:
        provide, via the user interface, an option to request a second subset of the optical network information associated with a second set of super-channels of the plurality of sets of super-channels,
            the second subset of the optical network information being different from the first subset of the optical network information;
        receive, via the user interface, selection of the option; and
        provide, via the user interface, information that identifies the second subset of the optical network information associated with the second set of super-channels.

4. The device of claim 1, where the one or more processors are further configured to:
    receive information that identifies a particular super-channel of the particular set of super-channels;
    identify an optical route associated with the particular super-channel; and
    provide information that identifies the optical route associated with the particular super-channel via the user interface.

5. The device of claim 1, where the request includes information identifying the particular set of super-channels; and
    where the one or more processors, when providing the information that identifies the subset of the optical network information, are configured to:
        identify the subset of the optical network information based on the information identifying the particular set of super-channels; and
        provide the information that identifies the subset of the optical network information.

6. The device of claim 1, where the plurality of sets of super-channels includes a first set and a second set,
    the first set including a same quantity of super-channels as the second set.

7. The device of claim 1, where the subset of the optical network information includes, for a super-channel of the particular set of super-channels, information that identifies one or more spectral slices associated with the super-channel, an optical power associated with the super-channel, an alarm associated with the super-channel, or a service state associated with the super-channel,
    each of the one or more spectral slices representing a portion of a frequency band; and where the one or more processors are further configured to:
provide, via the user interface, the information that identifies the one or more spectral slices, the optical power, the alarm, or the service state in association with information identifying the super-channel.

8. A non-transitory computer-readable medium storing instructions, the instructions comprising:
one or more instructions that, when executed by one or more processors, cause the one or more processors to:
receive optical network information associated with a plurality of super-channels,
each super-channel, of the plurality of super-channels, including a plurality of optical channels transported as a single optical channel;
assign the plurality of super-channels to a plurality of groups of super-channels,
each group, of the plurality of groups of super-channels, being associated with at least one super-channel of the plurality of super-channels, and
at least two groups, of the plurality of groups of super-channels, including two or more super-channels of the plurality of super-channels;
receive a request for a portion of the optical network information associated with a particular group of super-channels of the plurality of groups of super-channels;
identify the portion of the optical network information relating to one or more super-channels in the particular group of super-channels; and
provide, via a user interface, the portion of the optical network information relating to the one or more super-channels in the particular group of super-channels based on the request.

9. The non-transitory computer-readable medium of claim 8, where the portion of the optical network information is a first portion of the optical network information and the particular group of super-channels is a first group of super-channels; and
where the one or more instructions, when executed by the one or more processors, further cause the one or more processors to:
provide, via the user interface, an option to request a second portion of the optical network information associated with a second group of super-channels of the plurality of groups of super-channels,
the second portion of the optical network information being different from the first portion of the optical network information;
receive, via the user interface, selection of the option; and
provide, via the user interface, information that identifies the second portion of the optical network information associated with the second group of super-channels.

10. The non-transitory computer-readable medium of claim 8, where the request for the portion of the optical network information is received based on a user interaction with the user interface.

11. The non-transitory computer-readable medium of claim 8, where the portion of the optical network information includes information that identifies at least two optical nodes that communicate using a super-channel of the particular group of super-channels.

12. The non-transitory computer-readable medium of claim 8, where the plurality of groups of super-channels includes a first group and a second group,
the first group including a same quantity of super-channels as the second group.

13. The non-transitory computer-readable medium of claim 8, where the portion of the optical network information includes, for a super-channel of the particular group of super-channels, information that identifies one or more spectral slices associated with the super-channel, an optical power of the super-channel, an alarm associated with the super-channel, or a service state associated with the super-channel,
each of the one or more spectral slices representing a portion, of a particular size, of a frequency band.

14. The non-transitory computer-readable medium of claim 8, where the portion of the optical network information includes, for an optical device associated with a super-channel of the particular group of super-channels, information that identifies an optical power of the optical device and a service state associated with the optical device.

15. A method, comprising:
receiving, by a device, optical network information associated with a plurality of super-channels,
each super-channel, of the plurality of super-channels, including a plurality of optical channels transported together as a single optical channel;
identifying, by the device, a quantity of the plurality of super-channels based on receiving the optical network information;
assigning, by the device, the plurality of super-channels to a plurality of sets of super-channels based on the quantity,
each set, of the plurality of sets of super-channels, including one or more super-channels of the plurality of super-channels, and
at least two sets, of the plurality of sets of super-channels, including two or more super-channels of the plurality of super-channels;
receiving, by the device and based on a user interaction with a user interface, a request that includes information relating to a particular set of super-channels of the plurality of sets of super-channels;
identifying, by the device, a portion of the optical network information relating to the particular set of super-channels; and
providing, by the device and via the user interface, the portion of the optical network information relating to the particular set of super-channels.

16. The method of claim 15, where the portion of the optical network information is a first portion of the optical network information and the particular set of super-channels is a first set of super-channels; and
the method further comprising:
providing, via the user interface, an option to request a second portion of the optical network information associated with a second set of super-channels of the plurality of sets of super-channels,
the second portion of the optical network information being different from the first portion of the optical network information;
receiving, via the user interface, selection of the option; and
providing, via the user interface, information that identifies the second portion of the optical network information associated with the second set of super-channels.

17. The method of claim 15, where the user interface includes a graphical representation of the particular set of super-channels.

18. The method of claim 15, where the request is a first request and the portion of the optical network information is a first portion of the optical network information; and the method further comprising:

receiving a second request for a second portion of the optical network information relating to an optical route of a super-channel included in the particular set of super-channels; and providing, via the user interface, the second portion of the optical network information relating to the optical route based on the second request.

19. The method of claim 15, where the portion of the optical network information includes, for a super-channel of the particular set of super-channels, information that identifies one or more spectral slices associated with the super-channel, an optical power of the super-channel, an alarm associated with the super-channel, or a service state associated with the super-channel, each of the one or more spectral slices representing a portion of a frequency band; and the method further comprising:

providing, via the user interface, the information that identifies the one or more spectral slices, the optical power, the alarm, or the service state in association with information identifying the super-channel.

20. The method of claim 15, where the particular set of super-channels is a first set of super-channels and the portion of the optical network information includes a first portion of the optical network information; and where providing the portion of the optical network information includes:

presenting, via the user interface, the first portion of the optical network information without presenting, via the user interface, a second portion of the optical network information relating to a second set of super-channels of the plurality of sets of super-channels.

* * * * *